(12) United States Patent
Ravi

(10) Patent No.: US 9,332,065 B2
(45) Date of Patent: *May 3, 2016

(54) METHODS AND APPARATUS FOR IDENTIFYING BROWSER USE ON A MOBILE DEVICE

(71) Applicant: Parrable, Inc., New York, NY (US)

(72) Inventor: Dharun Ravi, Plainsboro, NJ (US)

(73) Assignee: PARRABLE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,272

(22) Filed: Jul. 24, 2014

(65) Prior Publication Data

US 2015/0334172 A1    Nov. 19, 2015

Related U.S. Application Data

(60) Provisional application No. 62/000,518, filed on May 19, 2014.

(51) Int. Cl.
*H04L 29/08* (2006.01)
*G06F 17/22* (2006.01)
*G06Q 30/02* (2012.01)

(52) U.S. Cl.
CPC ............ *H04L 67/10* (2013.01); *G06F 17/2247* (2013.01); *G06Q 30/02* (2013.01); *H04L 67/02* (2013.01); *H04L 67/20* (2013.01)

(58) Field of Classification Search
CPC .......... G06Q 30/0269; G06Q 30/0241; G06Q 30/0255; G06Q 30/0271; G06Q 20/4014; H04N 21/4782; H04M 3/42272; H04W 4/206; H04L 67/30; H04L 67/306; H04L 9/0813; H04L 9/0844; H04L 9/3213; H04L 63/102; H04H 60/33; H04H 60/46
USPC .......... 705/14.55, 14.64, 14.51, 14.53, 14.73, 705/14.25; 709/204, 203, 219, 224; 715/738; 717/178
See application file for complete search history.

(56) References Cited

U.S. PATENT DOCUMENTS

| | | | |
|---|---|---|---|
| 6,880,086 B2* | 4/2005 | Kidder | G06F 1/14 713/177 |
| 9,106,666 B2* | 8/2015 | Omar | H04L 63/102 |
| 2002/0065920 A1* | 5/2002 | Siegel et al. | 709/227 |
| 2004/0019688 A1* | 1/2004 | Nickerson et al. | 709/229 |
| 2004/0049537 A1* | 3/2004 | Titmuss | 709/203 |
| 2005/0223093 A1* | 10/2005 | Hanson et al. | 709/224 |
| 2008/0168052 A1* | 7/2008 | Ott et al. | 707/5 |
| 2008/0200207 A1* | 8/2008 | Donahue et al. | 455/556.2 |
| 2008/0289030 A1* | 11/2008 | Poplett | 726/15 |

(Continued)

FOREIGN PATENT DOCUMENTS

| | | |
|---|---|---|
| JP | 2013-222440 | 10/2013 |
| WO | WO 01/50299 | 7/2001 |
| WO | WO 2015/179242 | 11/2015 |

OTHER PUBLICATIONS

PCT Application No. PCT/US2015/031144 International Search Report and Written Opinion mailed Aug. 27, 2015.

*Primary Examiner* — Alina N Boutah
(74) *Attorney, Agent, or Firm* — Polsinelli LLP

(57) ABSTRACT

The present invention relates to methods and apparatus for in obtrusively determining previous actions and information associated with a user and generating web page content based upon previous actions and stored information.

19 Claims, 7 Drawing Sheets

(56) References Cited

U.S. PATENT DOCUMENTS

| | | | |
|---|---|---|---|
| 2009/0049468 A1* | 2/2009 | Shkedi | G06Q 30/0241 725/34 |
| 2009/0094044 A1* | 4/2009 | Peterson, Jr. | 705/1 |
| 2010/0070876 A1* | 3/2010 | Jain et al. | 715/748 |
| 2010/0146607 A1* | 6/2010 | Piepenbrink et al. | 726/7 |
| 2010/0211885 A1* | 8/2010 | Berg et al. | 715/745 |
| 2011/0167333 A1* | 7/2011 | Sakata | 715/234 |
| 2011/0283329 A1* | 11/2011 | Davis et al. | 725/62 |
| 2011/0307354 A1* | 12/2011 | Erman et al. | 705/27.1 |
| 2012/0021733 A1* | 1/2012 | Lin et al. | 455/418 |
| 2012/0059713 A1* | 3/2012 | Galas et al. | 705/14.49 |
| 2012/0064829 A1* | 3/2012 | Hart et al. | 455/41.2 |
| 2012/0089996 A1* | 4/2012 | Ramer et al. | 725/14 |
| 2012/0101847 A1* | 4/2012 | Johnson et al. | 705/3 |
| 2012/0101903 A1* | 4/2012 | Oh et al. | 705/14.66 |
| 2012/0136856 A1* | 5/2012 | Fitzpatrick et al. | 707/728 |
| 2012/0210131 A1 | 8/2012 | Knowles et al. | |
| 2012/0303454 A1* | 11/2012 | Gupta | 705/14.53 |
| 2012/0324375 A1* | 12/2012 | Mathews | 715/760 |
| 2013/0060868 A1* | 3/2013 | Davis et al. | 709/206 |
| 2013/0065569 A1* | 3/2013 | Leipzig et al. | 455/416 |
| 2013/0073473 A1* | 3/2013 | Heath | 705/319 |
| 2013/0086179 A1* | 4/2013 | Coleman et al. | 709/206 |
| 2013/0167195 A1* | 6/2013 | Etchegoyen | 726/3 |
| 2013/0197998 A1* | 8/2013 | Buhrmann et al. | 705/14.53 |
| 2013/0218721 A1* | 8/2013 | Borhan et al. | 705/26.41 |
| 2013/0246072 A1* | 9/2013 | Duffield | 704/275 |
| 2013/0247224 A1* | 9/2013 | Karlson et al. | 726/28 |
| 2013/0262233 A1* | 10/2013 | Bradley et al. | 705/14.64 |
| 2013/0273968 A1* | 10/2013 | Rhoads et al. | 455/556.1 |
| 2013/0305385 A1* | 11/2013 | Korteweg et al. | 726/27 |
| 2014/0006129 A1* | 1/2014 | Heath | 705/14.23 |
| 2014/0108029 A1* | 4/2014 | Kim | 705/2 |
| 2014/0143353 A1* | 5/2014 | Wang et al. | 709/206 |
| 2014/0143647 A1* | 5/2014 | Reshadi et al. | 715/234 |
| 2014/0150072 A1* | 5/2014 | Castro et al. | 726/5 |
| 2014/0181193 A1* | 6/2014 | Narasimhan et al. | 709/204 |
| 2014/0222561 A1* | 8/2014 | Mathur | 705/14.53 |

* cited by examiner

METHODS AND APPARATUS FOR IDENTIFYING BROWSER USE ON A MOBILE DEVICE

FIELD OF INVENTION

This invention relates to methods and apparatus for safely and unobtrusively identifying prior browsing patterns on a mobile device. More particularly, the present invention relates to utilizing an identifiable version of a graphical user interface and linking the identifiable graphical user interface to prior browsing.

BACKGROUND

Traditionally, tracing of visitor access to a website is accomplished via a browser creating small files of text descriptive of user browsing behavior and stored the file on a personal computer. The small file, sometimes referred to as a "cookie" or an "HTTP cookie", "web cookie", or "browser cookie". A browser checks for the cookie and if a cookie associated with a particular website is found on the personal computer, the cookie is sent to a website when a user requests that a website be accessed by the browser.

Typically, a cookie reports to the website "state" information based upon previous browser activity. State information may include almost any activity engaged by the user. Common aspects of state activity include items placed in shopping cart, or areas of previous interest.

Tracking cookies create references of a user's browsing history and aid a website to present content pertinent to the user. Cookies are also utilized to remember passwords for users and remember input a user has previously entered, such as a credit card number or an address.

When a user accesses a website with a cookie function the website may check for a cookie resident on the user's PC. If not cookie is found the website sends a cookie to the user's PC and the browser stores the cookie with the browser files in the PC. Subsequently, when the PC is used to access the same website, the website will recognize the PC because of the stored cookie with the user's information.

Mobile communication products, such as cellular telephone or a tablet may not receive and store racking cookies as readily as personal computers. This has created a dilemma since websites often rely on tracking cookie technology to offer full functionality on their website.

SUMMARY

Accordingly, the present invention provides methods and apparatus to identify a mobile device and associated web browsing activity from the mobile device and therefore, overcomes the disadvantages of prior art as briefly described above.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computing apparatus, such as a mobile device, capable of facilitating communication between a content provider and user, wherein the computing apparatus includes: a communications network access device for accessing a server in logical communication with a communications network; and executable software stored on the communications network access device and executable on demand. As discussed further below, the communications network access device may include a mobile device, such as a phone or a tablet capable of accessing a content provider server via the Internet or other communications network. Access may be accomplished via a cellular network, or a WiFi connection to an Internet Protocol based network.

The computing apparatus also enables the receipt of a unique Graphical User Interface ("GUI") including identification information, such as an identification tag. Aspects of the invention also include transmitting a stored version of the GUI including the identification tag to an external server. Computing methods included in the present invention also includes receiving profile information from the external server, where the profile information is associated with the transmitted identification information.

The methods also include presenting the profile information to an interested party, such as a website content provider. The computing also includes prompting the interested party to take one or more actions based upon to the presented profile information. The computing also includes transmitting a URL based upon the presented profile information.

Other examples of this aspect include corresponding computer systems, apparatus, and computer programs recorded on one or more computer storage devices, each configured to perform the actions of the methods.

Implementations may include one or more of the following features. Implementations may include the apparatus where the identification information is logically embedded in a GUI or other URL content configured to be placed on or within website content. Implementations may include the apparatus where the content further includes a tag configured to wirelessly transmit the identification information from a mobile network access device. Implementations may include the computing apparatus where the communications mobile network access device is further caused to transmit a most recent version of a website downloaded to the mobile device. Implementations may include the computing apparatus where the identification information is logically embedded in a readable code portion of the website content. Implementations may include the computing apparatus where the communications network access device is further caused to notify the website or URL provider of a receipt of the identification information included in the website content.

In some aspects of the present invention, a computing apparatus includes a computer server that is designed and built to provide custom web page content to a communications network access device designed and built to access the server via logical communication over a communications network. A network access device may include, by way of non-limiting example, a cellular device such as a smart phone or tablet. Popular devices include an Android™ phone or tablet or an Apple™ iPhone or iPad. In some embodiments, executable software is stored on the communications network access device and executable on demand, wherein the software is operative with the communications network access device to cause the network access device to receive identification information associated with a first web page content and store the identification information with the first web page content on the network access device.

The network access device may transmit the identification information to the server and receive a second webpage content based upon one or both of the transmitted identification information and the first web page content. In some embodiments, the identification information may be logically embedded in the first web page content. The identification information may include a Token.

In another aspect, the network access device may be in logical communication with a cellular network or a WiFi network. In some particular examples, the identification information may be associated with a unique uniform resource locator.

In still another aspect identification information may be associated with a profile including one or more user interests and the second web page content is associated with the one or more user interests of the profile.

Methods may additionally include the steps of: presenting a website content associated with a Uniform Resource Locator ("URL") to an operator of a mobile computing device, wherein the presenting of the data stream includes a unique identifier of a user associated with the mobile computing device. The website content may include an interest prompt and a contact information data segment; and collecting a user response from the operator of the computing device; transmitting a data stream to another computing device, where the application software operating on the other computing device may process the data stream; and communicate additional content based upon the information in the data stream.

The method may include examples wherein an identification device includes an image, a number, an alphanumeric value, a hash tag, a barcode, universally unique identifier, a code based upon time date and location, a code based upon a type of user device or other mechanism. An example may include the method where the image includes a logo associated with a modified logo. Implementations of the described techniques may include hardware, a method or process, or computer software on a computer-accessible medium.

One general aspect includes a computer apparatus for tracking prior activity by a network access device, where the computing apparatus includes: a computer server in logical communication with a communications network; and executable software stored on the server and executable on demand, the software operative with the server to cause the server to: receive identification information associated with a first web page content; access user profile associated with the identification information; generate a second webpage content base upon the identification information and the first web page content; and transmit the second webpage content to the network access device associated with the identification information and the first web page content. Other embodiments of this aspect include corresponding computer systems, apparatus, and computer programs recorded on one or more computer storage devices, each configured to perform the actions of the methods.

The details of one or more examples of the invention are set forth in the accompanying drawings and the description below. The accompanying drawings that are incorporated in and constitute a part of this specification, illustrate several examples of the invention and, together with the description, serve to explain the principles of the invention: Other features, objects, and advantages of the invention will be apparent from the description, drawings and the claims herein.

DESCRIPTION OF THE DRAWINGS

The foregoing and other features and advantages of the invention will be apparent from the following, more particular description of preferred examples of the invention, as illustrated in the accompanying drawings.

DETAILED DESCRIPTION

The present invention relates generally to identifying a User with one or both of previous web content presented to the User and actions taken by the User while browsing a website, URL or other network accessible resource. In general, the present invention creates a customized GUI when a User accesses a website. A network access device, such as a mobile phone or tablet or a personal computer used by the User to access the website will typically store a version of the website on the network access device and when the User subsequently accesses the website, the website content provider will compare the version of the website stored on the network access device with a current version of the content on a website and only transmit those portions that have changed since the version on the network access device was last stored.

By creating a customized GUI specific to the User, the User stores a version of the website GUI specific to the User. When the User subsequently accesses the website and presents a last of the website stored on the User Network Access Device that is specific to the User, the website is able to ascertain content previously accessed by the User and actions previously taken by the User. In essence, the stored version of the website GUI acts not only to limit an amount of data needed to be download to view the website on a subsequent visit, but also to identify the User.

Glossary

As used herein the following terms will have the following associated meaning:

Token (sometime referred to as a "Tag"): as used herein refers to an identifier included in content downloaded to a user's network access device. Examples of a Token include, but are not limited to: a number, an alphanumeric value, a hash mark, a symbol, a pattern embedded in a logo, a UUID, a bar code or other device for conveying data.

Logo: as used herein refers to an image that indicates an identification of a good, service or legal entity. As used herein a logo image may further include a unique identification device.

User: as used herein refers to an individual, company, or group that operate a network access device, such as a mobile cellular device or a personal computer, to access a resource on the Internet.

Figure 1:
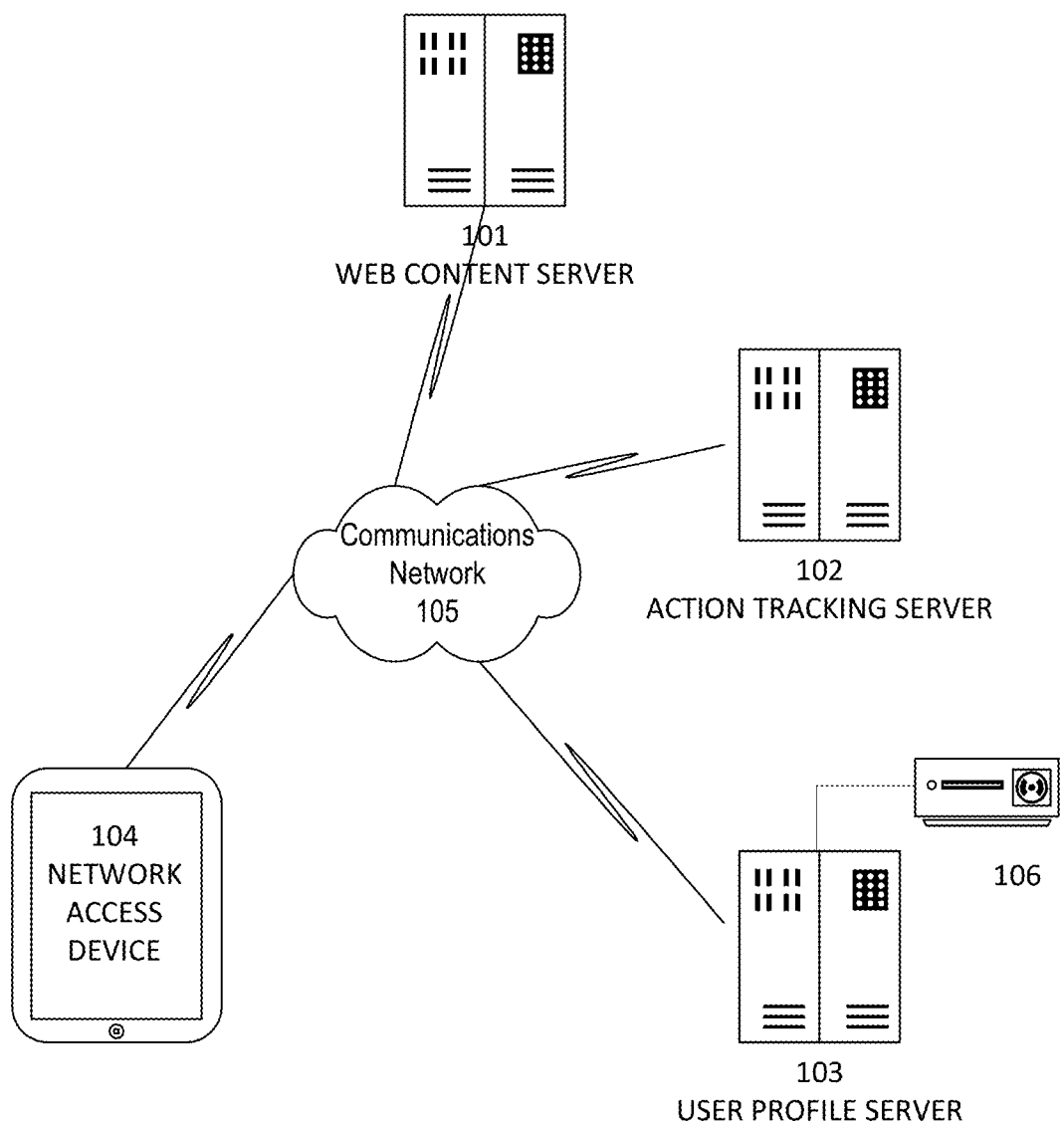
FIG. 1 illustrates an exemplary embodiment of a block diagram of components that may be involved in some implementations of the present invention.

Referring now to FIG. 1, a block diagram of some exemplary implementations of the present invention is illustrated. A web content server 101 provides content that may be accessed via a uniform resource locator URL or other resource location device, such as, for example an IP Address. The web content server 101 provides digital data that is functional with a network access device, such as a smart phone, tablet or other cellular device, to generate a graphical user interface. According to the present invention, the web content server 101 provides a GUI with at least some portion of the GUI unique to a particular network access device 104. The Web Content Server 101 may include software that may be executed to builds a URL with a token or tag built into the URL.

An Action Tracking Server 102 tracks actions taken by a user via the network access device 104 and stores a record of actions taken. A User Profile Server 103 is functional to maintain records including information associated with a User. The User Profile Server 103 may store records of what website were accessed by the Network Access Device 104 associated with the use, and actions, such as those tracked by action Tracking Server 102. The User Profile Server may also maintain records of information indicating one or more of: a geolocation from which a User accesses a Web Content Server 101; a time of day that the User access the Web Content Server 101; a type of device used as a Network Access Device 104; an operating system used on the Network Access Device 104; previous advertisements viewed; previous actions; previous pages visited; previous products for which information was queried; if and when an ad was closed; how far in a progression of ad steps a User progressed; what IP addresses as associated with the network access device; locations of various IP addresses associated with a same network access device; and other information that may be used to help ascertain what a Use has done and may do in the future.

In another aspect, although the present invention does not require the use of cookies, in some implementations, the present invention may track the content of cookies and store the content of cookies in a User Profile. The User Profile may be tracked to a Network Access device and to IP addresses. In this manner, some of the benefit of a cookie may be maintained in a place other than the User's storage medium, wherein the User's storage medium may include as the User's hard drive and the place other than the User's hard drive may include a User Profile Server 103. According to the present invention, the User Profile Server 103 may be accessed by a Web Content Provider and the Web Content Server 101 in determining content to be provided to a specific user.

Accordingly, by storing the content of cookies in a User Profile 106 on a User Profile Server 103, a Web Content Server 101 may be able to benefit from the data included in the cookie, even if the cookie is subsequently destroyed or made inaccessible on the User's network Access Device 104.

Figure 2:
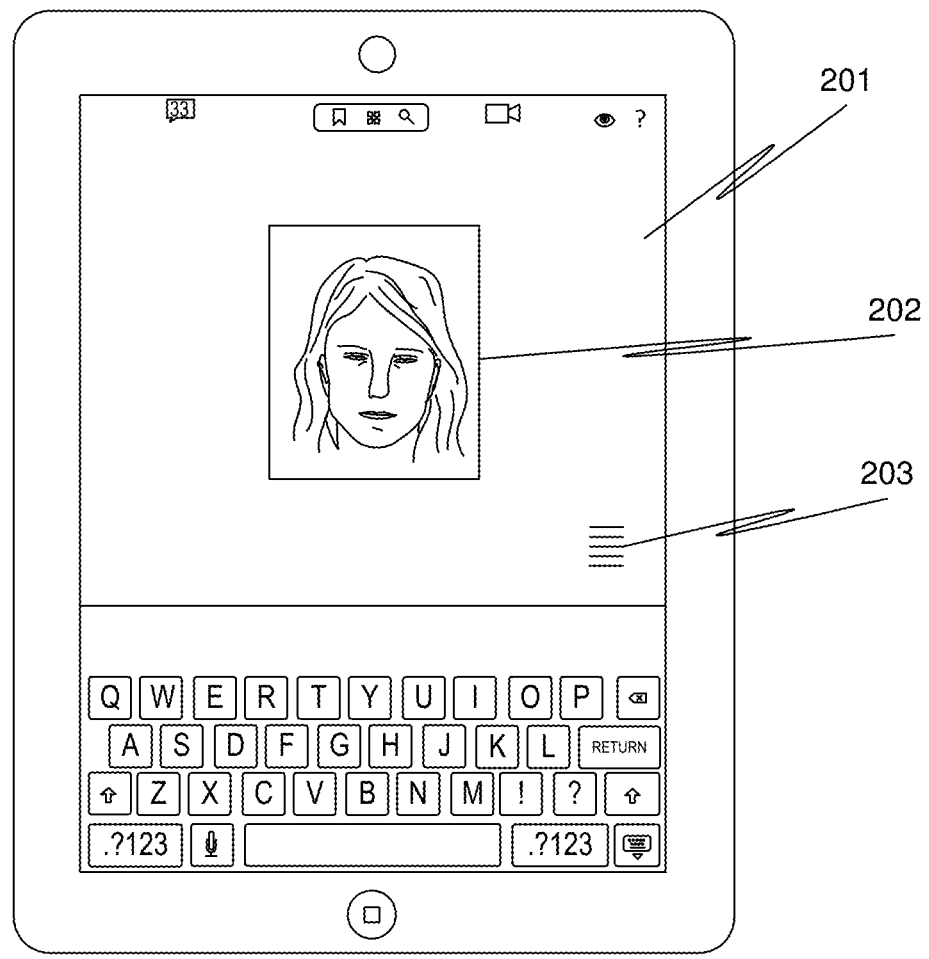
FIG. 2 illustrates a mobile apparatus with a graphical user interface including a unique identifier.

Referring now to FIG. 2, an example of a GUI 201 presented on a mobile device 200 is illustrated. In some examples, as shown in FIG. 2, the GUI 201 may comprise an image 202 and a separate identification code, such as a Token 203. The Token 203 may be identifiable by a human or incorporated into code used to present the GUI to the User. Alternatively, a web content provider may utilize their own mark as a base image for the Token 203 or other identification device. As such, a mark associated with a User may be altered in subtle ways that may embed the Token 203 into a comprehensive webpage GUI.

A GUI 201 including content viewable on the website is presented and stored on the mobile device 200. Included in the website content is the Token 203 or other unique identifier.

Figure 3:
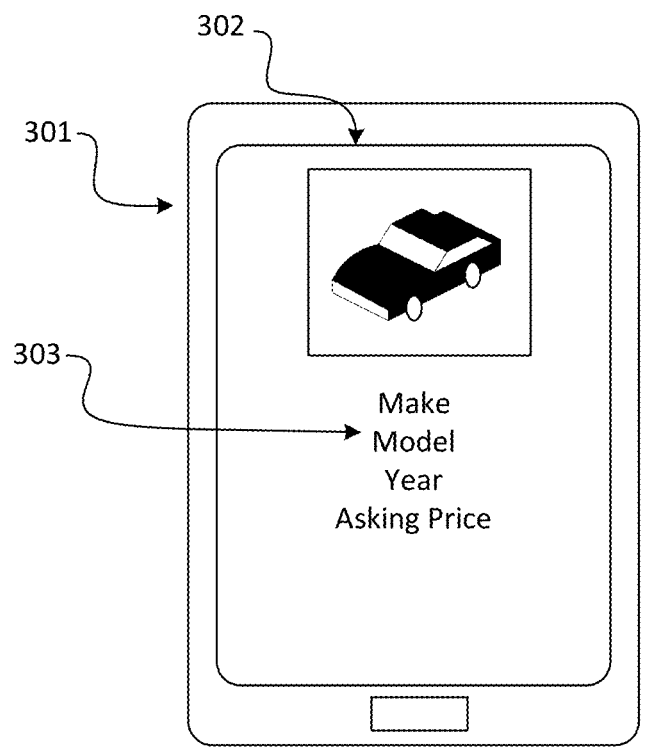
FIG. 3 illustrates an exemplary custom content transmitted to a user's mobile device.

Referring now to FIG. 3, an exemplary tablet 301 and GUI 302 specific to a User are illustrated. As presented, a user profile may be accessed to determine what may interest the User based upon previous browsing habits and website content accessed, as well as demographics and geopolitical data associated with an area from an IP address stored in a user profile. The User profile may be used to one or both of: generate custom content 303 and send custom content 303 to the User based upon information contained in the User Profile.

Figure 4:
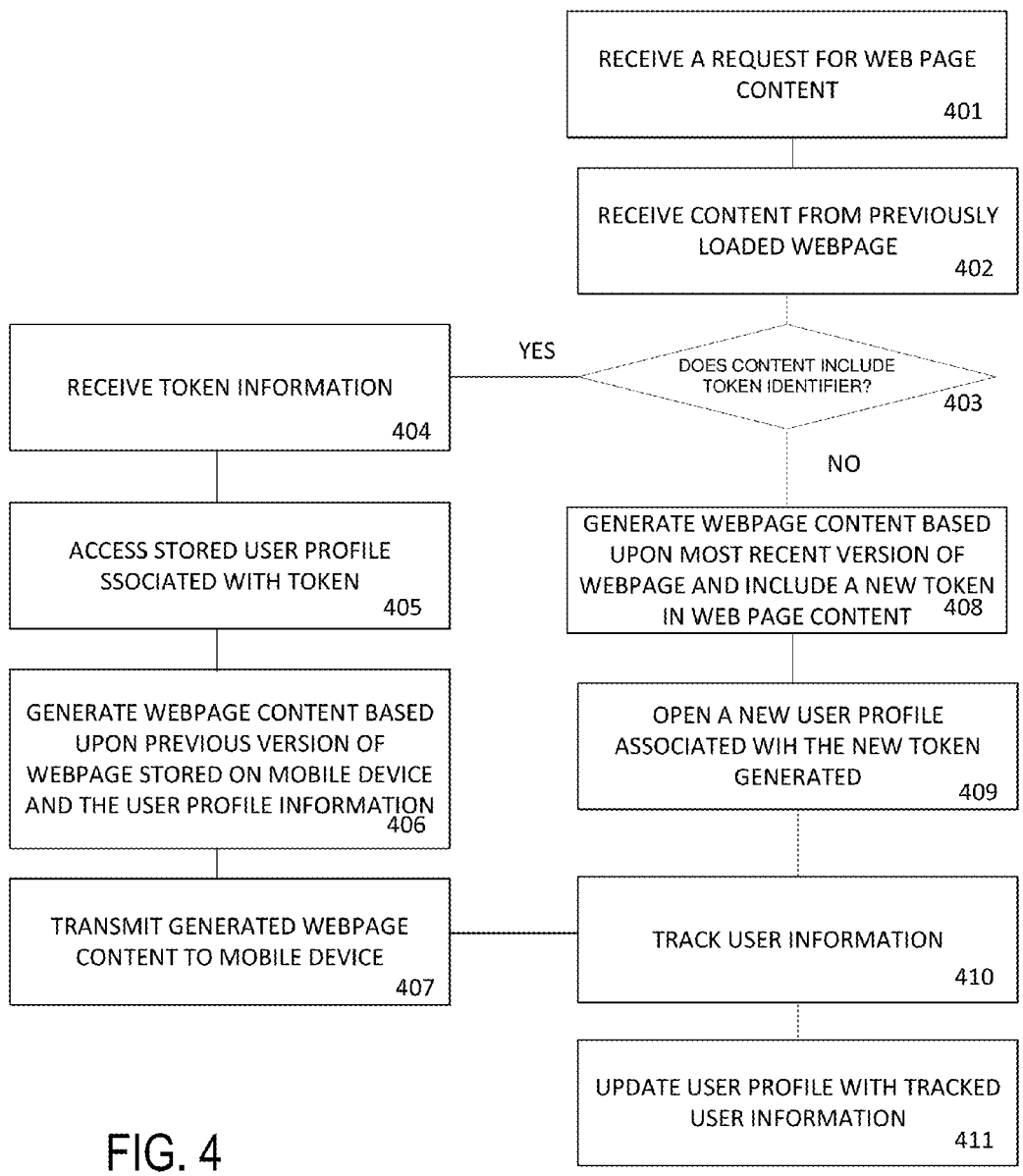
FIG. 4 illustrates an exemplary system for method steps that may be included in some implementations of the present invention.

Referring now to FIG. 4, some exemplary method steps that may be executed in some implementations of the present invention. At 401, a server may receive a request for web page content. The request may be received in various formats, such as, for example a URL entered into a browser.

At 402 the server may additionally receive content of a previously loaded web page from a network access device used to make the request for web page content.

At 403 it is determined if the content from the previously loaded web page includes a Token or other identifier. If the content does include a Token, then at 404 the server receives the Token information.

At 405, the server will access a User Profile stored on a server accessible to the web page content server. At 406 the webpage content server will generate content based upon one or both of the User Profile and the web page previously viewed. At 407, the generated web page content is transmitted to the User via the network access device operated by the User.

At 408, if a Token is not received from the User via a previous version of the URL content stored on the network access device, the server may generate webpage content based upon a most recent version of the web page and include in the generated content a new token.

At 409 a new User Profile may be generated and the new token may be associated with the User and the new User Profile. At 410, User information may be tracked. The User information may include one more of user actions, an IP address associated with the network access device used by the User, a geo location of the User, a time of day, a length of time online, a number of pages visited, an operating system used by the user, a length of time spent on various web pages, and any other information useful to better understand the User.

At 411 the User Profile may be updated with the tracked user information.

Figure 5:
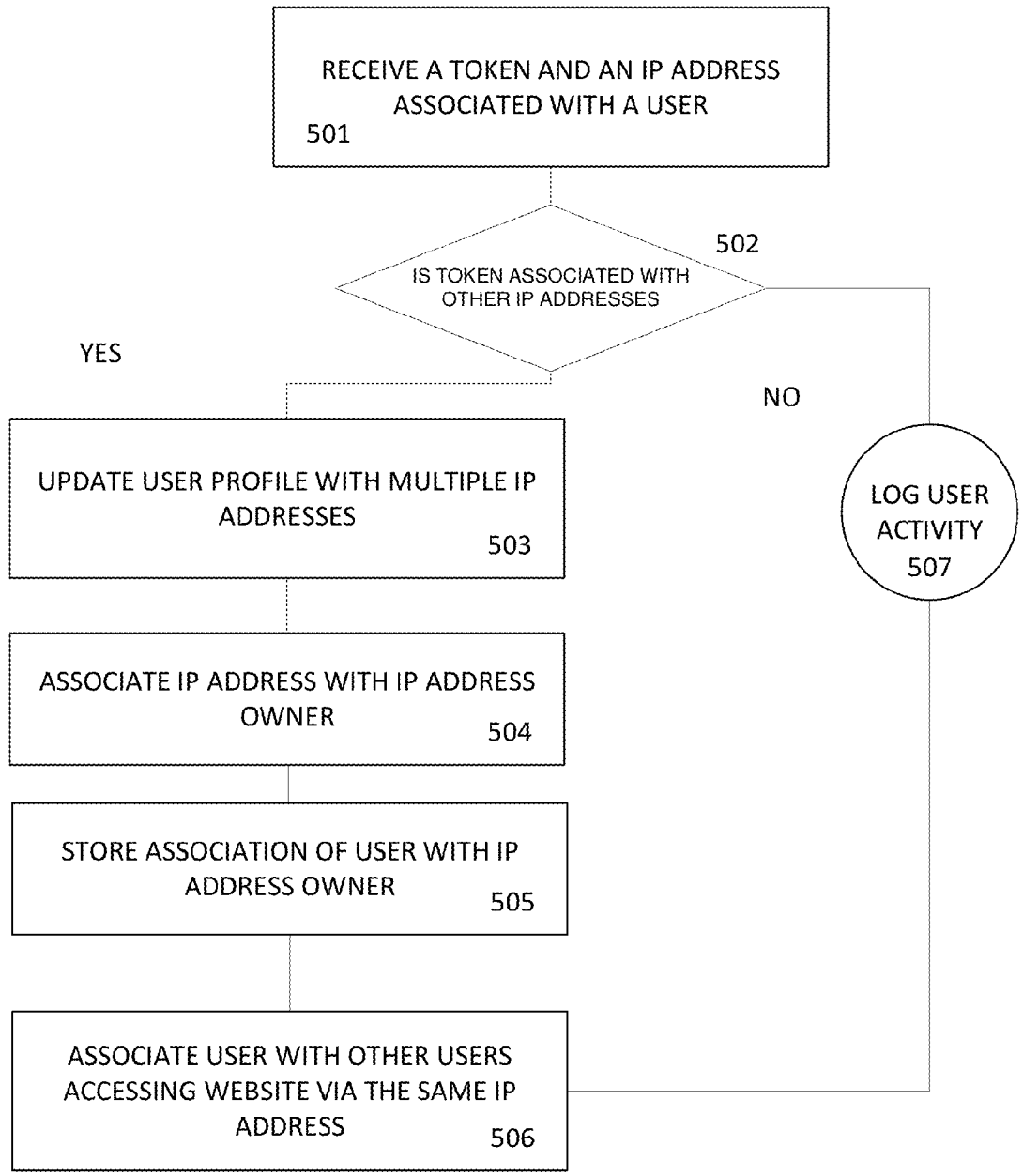
FIG. 5 illustrates additional method steps that may be included in some implementations of the present invention.

Referring now to FIG. 5, method steps are illustrated that may be implemented in some embodiments of the present invention. At 501 a server may receive a Token and an IP address associated with a User. At 502 it may be determined if the Token is associated with other IP addresses. If the Token is associated with other IP Addresses, at 503 the user Profile may be updated to include each IP address associated with the Token. At 504, the IP address may also be associated with an IP Address owner and at 506 the User may be associated with other users accessing the same web site via the same IP address or accessing other web pages via a same IP Address. At 507 User activity may be logged.

Figure 6:
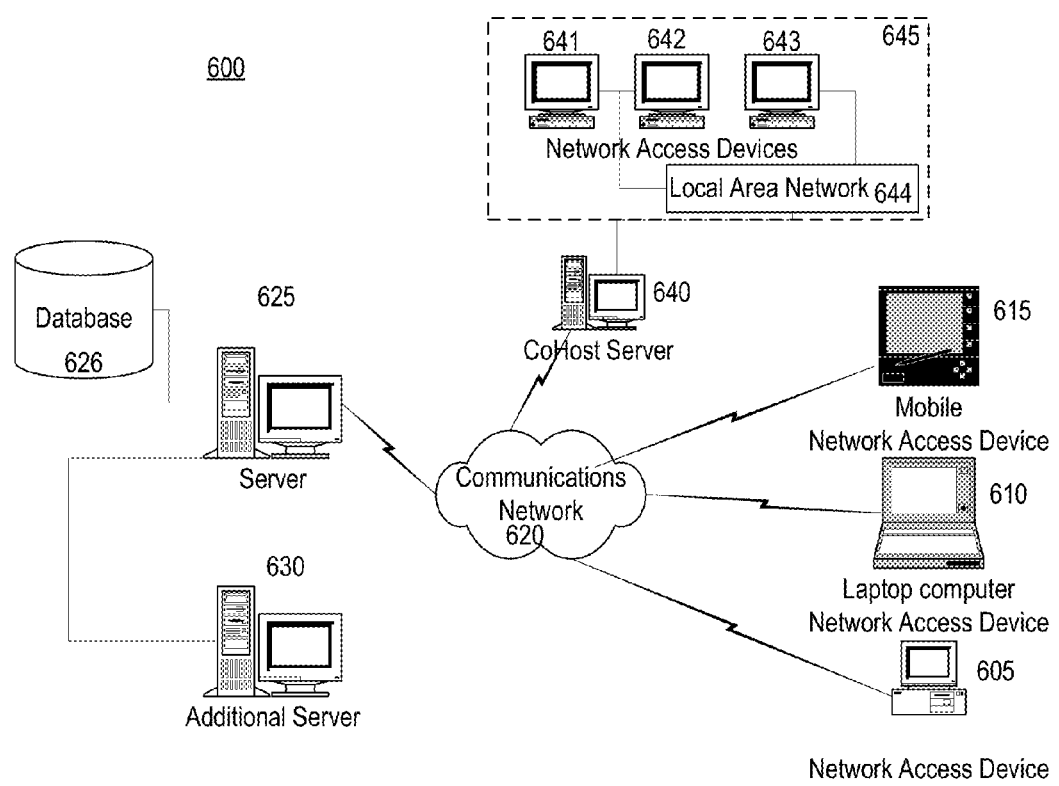
FIG. 6 illustrates an exemplary processing and interface system.

Referring now to FIG. 6, an exemplary processing and interface system 600 is illustrated. In some aspects, access devices, such as a network access device 605, a mobile network access device 615 or laptop computer network access device 610 may be able to communicate with an external server 625 though a communications network 620. The external server 625 may be in logical communication with a database 626, which may comprise data related to identification information and associated profile information. In some examples, the external server 625 may be in logical communication with an additional server 630, which may comprise supplemental processing capabilities.

In some aspects, the external server 625 and access devices may be able to communicate with a cohost server 640 through a communications network 620. The cohost server 640 may be in logical communication with an internal network 645 comprising network access devices 641, 642, 643 and a local area network 644. For example, the cohost server 640 may comprise a payment service, such as PayPal or a social network, such as Facebook or a dating website.

Figure 7:
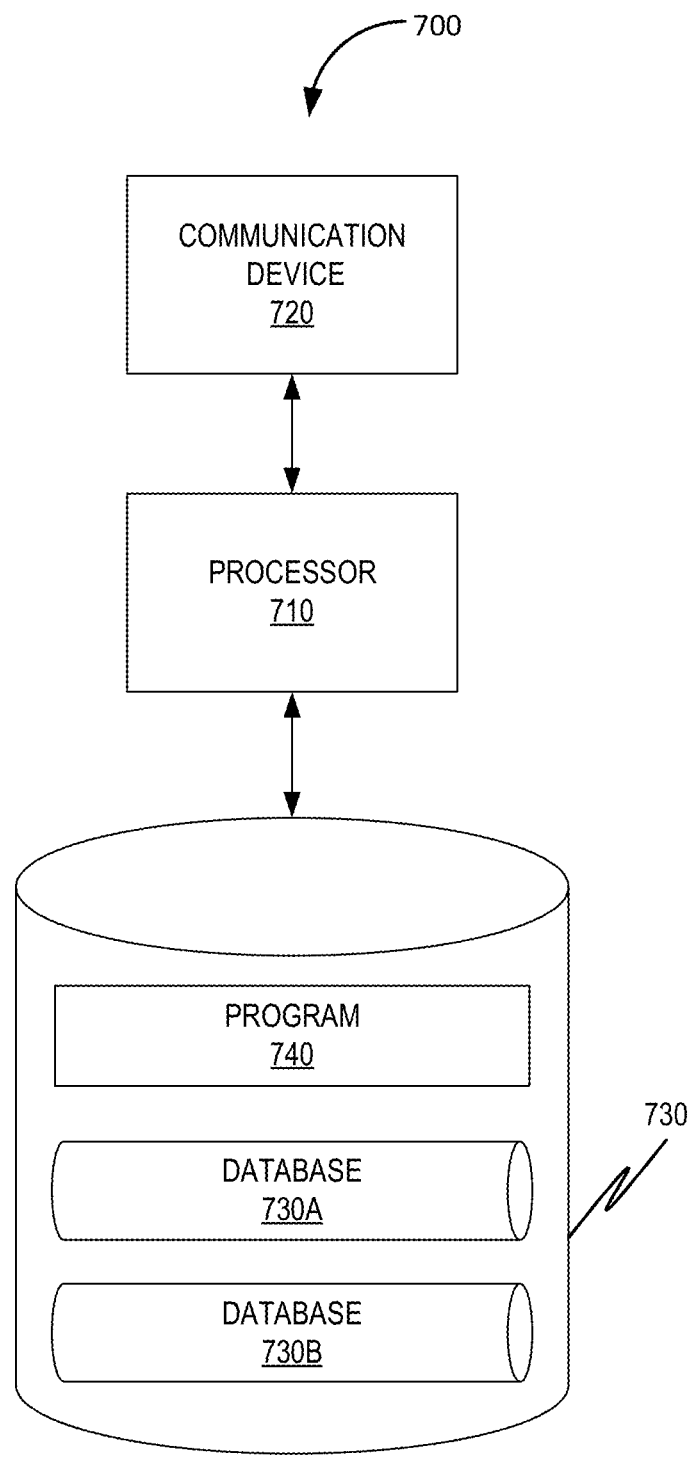
FIG. 7 illustrates exemplary controller that may be utilized in some implementations of the present invention.

Referring now to FIG. 7, an illustration is provided with a controller 700 that may be embodied in one or more of communications accessible devices and utilized to implement some embodiments of the present disclosure. Communications accessible devices may include, by way of example, a hand held device such as a cellular phone, a pad device, a personal computer, a server, a personal digital assistant, an electronic reader device or other programmable device.

The controller 700 comprises a processor 710, which may include one or more processors, coupled to a communication device 720 configured to communicate via a communication network, such as the Internet, or another cellular based network such as a 3G or 4G network (not shown in FIG. 7). The communication device 720 may be used to communicate with a digital communications network, such as, for example, the Internet available via the Internet Protocol, or a cellular network such as 3G or 4G.

The processor 710 is also in communication with a storage device 730. The storage device 730 may comprise any appropriate information storage device, including combinations of electronic storage devices, such as, for example, one or more of: hard disk drives, optical storage devices, and semiconductor memory devices such as Random Access Memory (RAM) devices and Read Only Memory (ROM) devices.

The storage device 730 can store a program 740 for controlling the processor 710. The processor 710 performs instructions of the program 740, and thereby operates in accordance with the present disclosure. The processor 710 may also cause the communication device 720 to transmit information, including, in some instances, control commands to operate apparatus to implement the processes described above. The storage device 730 can additionally store related data in a database 730A and database 730B, as needed.

A number of examples of the present invention have been described. While this specification contains many specific implementation details, there should not be construed as limitations on the scope of any inventions or of what may be claimed, but rather as descriptions of features specific to particular examples of the present invention.

Certain features that are described in this specification in the context of separate examples can also be implemented in combination in a single embodiment. Conversely, various features that are described in the context of a single embodiment can also be implemented in combination in multiple examples separately or in any suitable sub-combination. Moreover, although features may be described above as acting in certain combinations and even initially claimed as such, one or more features from a claimed combination may, in some cases, be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the examples described above should not be understood as requiring such separation in all examples, and it should be understood that the described program components and systems can generally be integrated together in a single software product or packaged into multiple software products.

While the invention has been described in conjunction with specific examples, it is evident that many alternatives, modifications, and variations will be apparent to those skilled in the art in light of the foregoing description. Accordingly, this description is intended to embrace all such alternatives, modifications, and variations as fall within its spirit and scope.

Although shown and described in what is believed to be the most practical and preferred examples, it may be apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A computing apparatus for tracking prior web page activity, the computing apparatus comprising:
    a communications network interface that accesses a server in logical communication with a communications network to download a version of web page content, the downloaded version of the web page content including unique identification information, wherein a new user profile is created and associated with the unique identification information;
    memory that stores the downloaded version of the web page content including the unique identification information; and
    a processor that executes executable software stored on the communications network access device, wherein execution of the software by the processor generates a graphic user interface (GUI) display based on the downloaded version of the web page content;
    wherein the communications network interface:
    transmits the downloaded version of the web page content including the unique identification information to the server, wherein the user profile is updated based on activity associated with the unique identification information, and wherein the server determines an IP address of the transmitted downloaded version of the web page and updates the user profile with the determined IP address,
        receives a new version of the webpage content in response to the transmitted unique identification information and the downloaded version of the web page content, and
        receives custom content based on the updated user profile.

2. The computing apparatus of claim 1, wherein the unique identification information is logically embedded in the downloaded version of the web page content.

3. The computing apparatus of claim 1, wherein the unique identification information comprises a token.

4. The computing apparatus of claim 1, wherein the unique identification information is associated with a unique uniform resource locator.

5. The computing apparatus of claim 1, wherein the unique identification information is associated with a profile comprising one or more user interests.

6. The computing apparatus of claim 5, wherein the second webpage content is associated with the one or more user interests comprising the profile.

7. A system for tracking prior web page activity, the system comprising:
    a computer server in logical communication with a communications network that hosts web page content and one or more user profiles; and
    a network access device comprising:
        a communications network interface that accesses the computer server to download a version of the web page content, the downloaded version of the webpage content including unique identification information, wherein a new user profile is created and associated with the unique identification information;

memory that stores the downloaded version of the web page content including the unique identification information; and a processor that executes software stored in memory, wherein execution of the software by the processor generates a graphic user interface (GUI) display based on the downloaded version of the web page content;

wherein the communications network interface:
 transmits the downloaded version of the webpage content including the unique identification information to the computer server, wherein the user profile is updated based on activity associated with the unique identification information, and wherein the server determines an IP address of the transmitted downloaded version of the web page and updates the user profile with the determined IP address,
 receives from the server a new version of the webpage content in response to the transmitted unique identification information and the downloaded version of the web page content; and
 receives custom content based on the updated user profile.

8. The system of claim 7, wherein the unique identification information is logically embedded in the first web page content.

9. The system of claim 7, wherein the unique identification information comprises a token.

10. The system of claim 7, wherein the unique identification information is associated with a unique uniform resource locator.

11. The system of claim 7, wherein the profile associated with the identification information comprises one or more user interests.

12. The system of claim 11, wherein the new version of the webpage content is associated with the one or more user interests comprising the profile.

13. A method for tracking prior web page activity, the method comprising:
 accessing a server over a communications network to download a version of web page content, the downloaded version of the web page content including unique identification information;
 storing in memory the downloaded version of the web page content including the unique identification information; and
 executing software stored in memory, wherein execution of the software by a processor generates a graphic user interface (GUI) display based on the downloaded version of the web page content;
 transmitting the downloaded version of the web page content including the unique identification information over the communications network to the server, wherein the server determines an IP address of the transmitted downloaded version of the web page and updates the user profile with the determined IP address; and
 receiving a new version of the webpage content in response to the transmitted unique identification information and the downloaded version of the web page content.

14. The method of claim 13, wherein the unique identification information is logically embedded in the downloaded version of the web page content.

15. The method of claim 13, wherein the unique identification information comprises a token.

16. The method of claim 13, wherein the unique identification information is associated with a unique uniform resource locator.

17. The method of claim 13, wherein the profile associated with the identification information comprises one or more user interests.

18. The method of claim 17, wherein the new version of the webpage content is associated with the one or more user interests comprising the profile.

19. A non-transitory computer-readable storage medium, having embodied thereon a program executable by a processor to perform a method for tracking prior web page activity, the method comprising:
 accessing a server over a communications network to download a version of web page content, the downloaded version of the web page content including unique identification information, wherein a user profile is created and associated with the unique identification information;
 storing in memory the downloaded version of the web page content including the unique identification information; and
 executing software stored in memory, wherein execution of the software by a processor generates a graphic user interface (GUI) display based on the downloaded version of the web page content;
 transmitting the downloaded version of the web page content including the unique identification information over the communications network to the server, wherein the user profile is updated based on activity associated with the unique identification information, and wherein the server determines an IP address of the transmitted downloaded version of the web page and updates the user profile with the determined IP address;
 receiving a new version of the webpage content in response to the transmitted unique identification information and the downloaded version of the web page content; and
 receiving custom content based on the updated user profile.

* * * * *